UNITED STATES PATENT OFFICE.

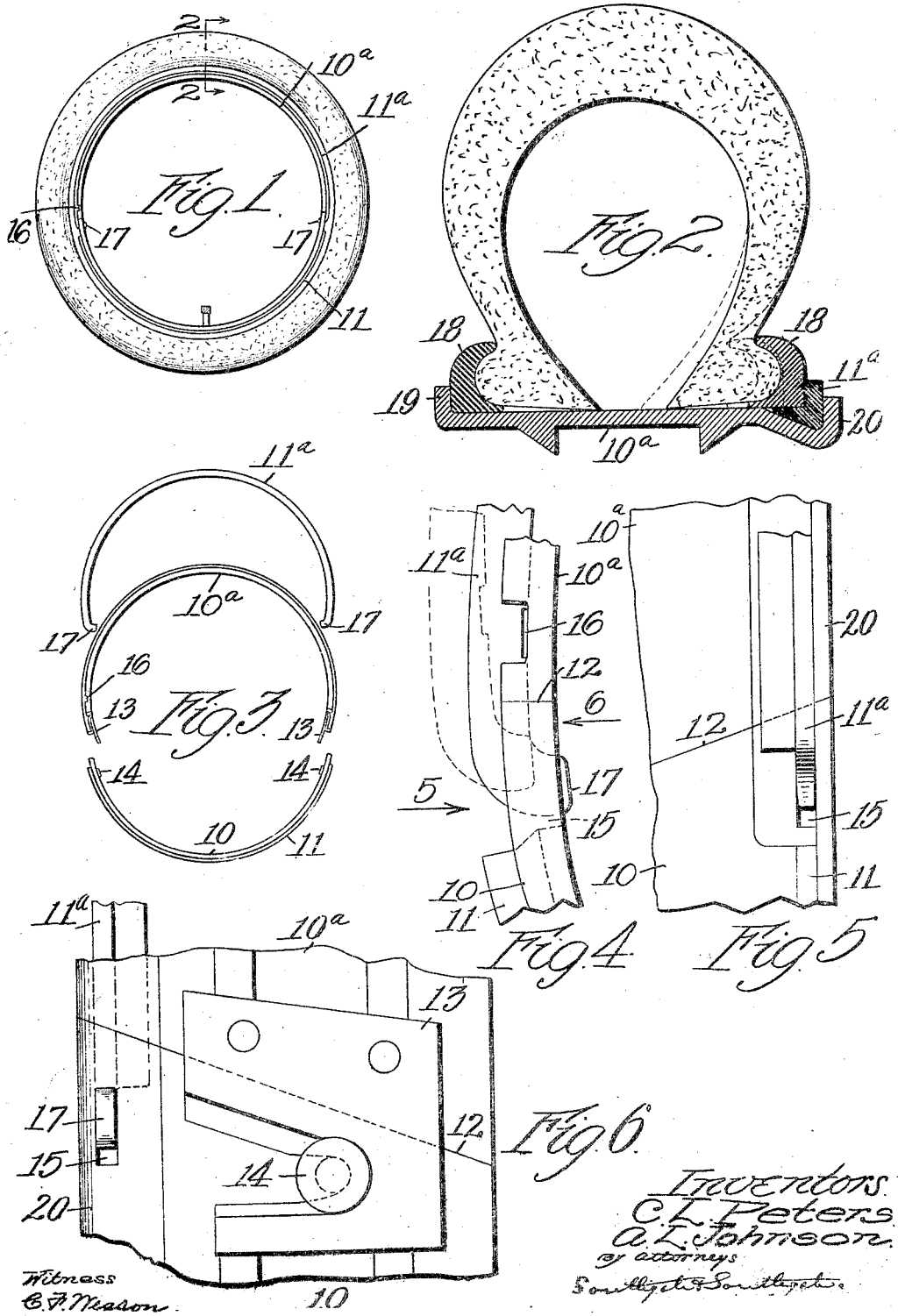

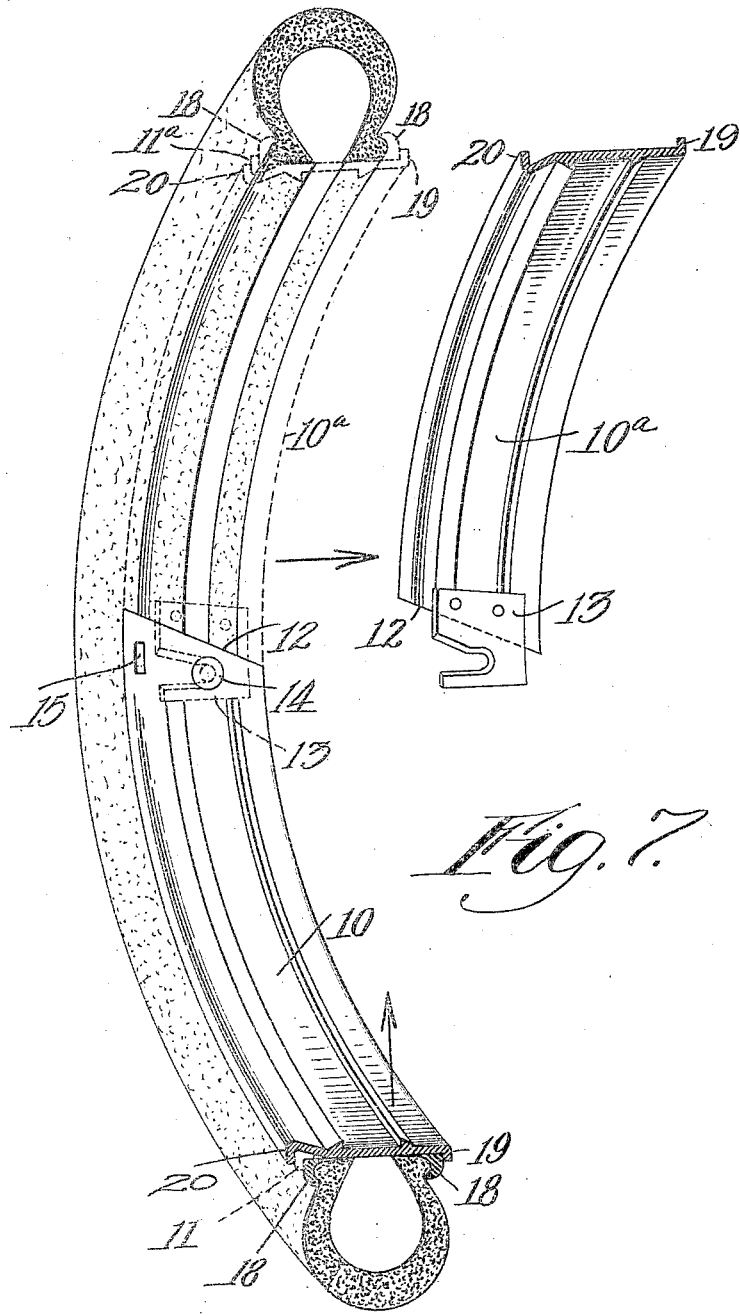

CHARLES L. PETERS AND ALVIN L. JOHNSON, OF WORCESTER, MASSACHUSETTS, ASSIGNORS TO TWO PART RIM COMPANY, INC., OF WORCESTER, MASSACHUSETTS, A CORPORATION OF DELAWARE.

DEMOUNTABLE RIM.

1,326,418.     Specification of Letters Patent.     Patented Dec. 30, 1919.

Application filed August 13, 1917, Serial No. 185,834. Renewed May 27, 1919. Serial No. 300,183.

*To all whom it may concern:*

Be it known that we, CHARLES L. PETERS and ALVIN L. JOHNSON, citizens of the United States, both residing at Worcester, in the county of Worcester and State of Massachusetts, have invented a new and useful Demountable Rim, of which the following is a specification.

This invention relates to a demountable rim for automobile and other vehicle tires, and the principal objects thereof are to provide a construction consisting of few parts, most of them absolutely stationary and capable of being unlocked and detached from each other in an extremely simple manner and yet of such construction that there is no possibility of accidental displacement of the parts or production of noise by rattling when in use. The invention also involves several features of construction as will appear.

Reference is to be had to the accompanying drawings, in which—

Figure 1 is a side elevation of a demountable rim constructed in accordance with this invention and shown completely assembled;

Fig. 2 is a sectional view on the line 2—2 in Fig. 1 greatly enlarged;

Fig. 3 is a view of the parts shown in Fig. 1 detached from each other;

Fig. 4 is a side elevation on enlarged scale of the locking end of the movable locking member and connected parts;

Fig. 5 is a view of the same taken in the direction of the arrow 5 in Fig. 4;

Fig. 6 is an inside view showing the means for connecting the two sections of the rim together; and Fig. 7 is a sectional perspective view showing how the parts are dismounted.

In external appearance this rim looks very similar to one of the rims now on the market and consisting of a single ring, but the base of the rim in this case is made up of two parts 10 and 10ª. One of these parts or sections as 10 constitutes less than a semicircle, and the other part 10ª more than a semicircle and together they constitute a complete circle or cylinder for receiving the tire and holding it on their outer circumferences. The surfaces 12 at which they come together are arranged at an angle to the axis as indicated in Fig. 6, and on both sides the two parts are connected by two locking members 13 and 14, one in the form of a hook firmly fixed to one of the sections, and the other in the form of a pin firmly fixed to the other section and of course fitting each other so that one of these rings, when otherwise unlocked, can be moved axially to disengage it entirely from the other. For example, in Fig. 6 the part 10ª can be moved away to the right leaving the tire on the part 10.

The beads of the tire are preferably engaged by two complete rings 18 which normally stay on the tire and are the parts that this demountable rim engages for locking purposes. On one side both of the sections 10 and 10ª are provided with fixed flanges 19, preferably integral for engaging the ring 18 on that side. For holding it on the other edge, one of the parts as for example 10, is provided with a small and stationary flange 20 for a similar purpose. In these drawings, however, it is shown as provided inside this flange with a portion of a ring 11 but the parts 11 and 20 do not need to be made separately unless desired, but at any rate they hold the ring 18 as far as they go. The corresponding element 11ª on the section 10ª is detachable. It is provided with a hook 17 at each end, and being more than a semicircle in shape, it is adapted to be fitted on and taken off in the following manner. The hooks fit into slots 15 formed in one section near the end, and when the rest of the parts are assembled with the tire in position the right-hand hook in Fig. 3 can be placed in the right-hand slot 15 and then the locking member swung around into closed position as shown in Fig. 1 until the left-hand hook also comes into the corresponding slot. The members 11 and 11ª are L-shaped in cross section and the bead ring 18 on that side overlies their circumferential flanges. The ring 11ª is held behind the flanges 20 so that it cannot be removed axially.

In order to disengage this locking member 11ª, the bead ring 18 on one side is pushed back as shown in dotted lines in Fig. 2 and a screw-driver or similar instrument is forced in at one side through a socket 16 and under the locking ring. This can then be pried up so as to spread the locking member, loosen the hook 17 from its notch, and allow the member 11ª to be swung around its other hook as a pivot and entirely detached. When this is accomplished the only thing that absolutely prevents the displacement of one segment from the other is removed and the longer segment can be detached by drawing it through the tire in the opposite direction as shown in Fig. 7.

From this it will be seen that the making of the two rim segments 10 and 10ª so that one of them has a longer arc than the other is an important feature enabling us to make this device out of two pieces instead of three as has been proposed before, and also permitting the use of a single movable locking member 11ª for effectively locking all parts together. In this way the device is reduced to its simplest terms and yet is made absolutely sure in its function of holding the parts together.

The locking member 11ª, being more than a semi-circle in length, holds itself in position by its natural resiliency because its ends are a shorter distance apart than the length of the diameter. Therefore even if the ring 18 could be moved back accidentally the locking member would still hold because the resistance that it offers to the forcing of these ends farther apart must be overcome to loosen it. Although hook-shaped ends 17 are employed they do not have to be undercut.

It will be observed that the open end of the hook 13 is directed toward the narrow side of the long section 10ª and that the hook is slanted back substantially parallel with the meeting ends of the two sections. This facilitates withdrawal of the short section.

Although we have illustrated and described only a single form of the invention we are aware of the fact that modifications can be made therein by any person skilled in the art without departing from the scope of the invention as expressed in the claims. Therefore we do not wish to be limited to all the details of construction herein shown and described except as expressed in the claims, but what we do claim is:—

1. A demountable rim having a base consisting of two sections, one having an arc of more than a semicircle and the other less than a semicircle so that together they constitute a complete circular rim, the longer one of said parts being movable in an axial direction, said parts having stationary means thereon for detachably holding them together and positively and permanently preventing the shorter section from moving inwardly toward the center, and a movable locking device for preventing their being detached.

2. A demountable rim having a base consisting of two sections, one having an arc of more than a semicircle and the other less than a semicircle so that together they constitute a complete circular rim, said parts having stationary means thereon for detachably holding them together comprising a pin fixed to one member and a hook fixed with respect to the other member and engaging said pin, and a movable locking ring at the edge for preventing their being detached.

3. A demountable rim having a base consisting of two sections, one having an arc of more than a semicircle and the other less than a semicircle so that together they constitute a complete circular rim, one of said parts being movable in an axial directions, said parts having stationary means thereon for detachably holding them together, the shorter of said sections having fixed flanges on both edges for holding the tire in position, the longer one having a fixed flange located along one edge, and a movable locking device for preventing their being detached located along the other edge.

4. A demountable rim comprising two sections of a general channel shape to hold the tire, stationary hooks and pins for holding said sections together, and a locking device consisting of an arc-shaped member having a hook at each end, said sections having recesses near the point where they join for receiving said hooks.

5. A demountable rim comprising two sections of a general channel shape to hold the tire, stationary hooks and pins for holding said sections together, and a locking device consisting of an arc-shaped member having a hook at each end, said sections having recesses near the point where they join for receiving said hooks, one of said sections having a flange extending outwardly beyond the edge of the locking device when in position, said flange having a recess for receiving an instrument for detaching the hook at that end from the rim.

6. A demountable rim comprising two sections, one having an arc of more than a semicircle and the other less than a semicircle so that together they constitute a complete circular rim, said parts having stationary means thereon for detachably holding them together, and a movable locking device for preventing their being detached, said sections fitting each other at their ends along planes located angularly with respect to the axis whereby one of them can be drawn out in a straight axial direction when unlocked.

7. A demountable rim having a base consisting of two sections, one having an arc of more than a semicircle and the other less than a semicircle so that together they constitute a complete circular rim fitting each other at their ends substantially at opposite sides of the circle along planes located angularly with respect to the axis whereby the longer one of them can be drawn out in a straight axial direction and having means for holding them together, the shorter one having permanent means for preventing its being drawn out axially.

8. A wheel rim comprising two detachably connected sections, one having fixed flanges on both sides for supporting both edges of a tire and the other having a fixed flange on one side only for supporting the tire, and a detachable locking device on the other side for supporting that edge of the tire, said other sections being removable from the tire and from the first section in an axial direction when said locking device is detached but having the edges abutting against the edges of the other section on opposite sides of the circle to render it incapable of moving inwardly in a radial direction.

9. A wheel rim comprising a section adapted to hold a tire on its outer surface, said section being bodily removable from the tire and from the rest of the rim in an axial direction and incapable of motion inwardly, and separable independent arc-shaped means extending more than half way around the rim for locking said section against such removal.

10. A demountable rim having a base consisting of two sections, together constituting a complete circular rim, and an arc shaped detachable locking member arranged along the edge of one of said sections and having hook-shaped ends hooking into slots near the ends of the other section.

11. A demountable rim comprising two sections, one having an arc of more than a semicircle and the other less than a semicircle so that together they constitute a complete circular rim, and an arc shaped detachable locking member arranged along the edge of the longer of said sections and engaging the ends of the shorter section, whereby said locking member is held in position by the fact that its ends are a distance apart shorter than the diameter.

12. A demountable rim comprising two sections, one having an arc of more than a semi-circle and the other less than a semi-circle so that together they constitute a complete circular rim, and an arc shaped detachable locking member arranged along the edge of the longer of said sections and having hook-shaped ends hooking into slots near the ends of the shorter section.

13. The combination with a rim having a base made up a plurality of sections arranged end to end to form a complete circle, of a detachable locking member therefor in the form of an arc longer than a semi-circle and materially less than a complete circle engaging both ends of one of said sections at substantially opposite sides of the rim.

14. A wheel rim comprising a rigid section adapted to hold a tire on its outer surface and constituting more than a semi-circle, said section being bodily removable from the tire and from the rest of the rim in an axial direction and incapable of motion radially inwardly, and means for holding said section against such removal.

15. A wheel rim having a base consisting of two detachably connected sections together making a complete circle adapted to receive a tire and a pair of bead rings on its outer surface, one of said sections extending more than half way around the rim in one piece and being removable from the other and from the tire in an axial direction through the tire and bead rings.

16. A wheel rim consisting of two detachably connected sections of unequal length, one short section having fixed flanges on both sides for holding both edges of a tire and the other longer section having a fixed flange on one side only for directly holding the tire, and a detachable locking device on the other side for holding that edge of the tire, said other sections being removable from the tire and from the first section in an axial direction when said locking device is detached but being incapable of moving inwardly in a radial direction.

17. A demountable rim consisting of two detachably connected unequal sections together constituting a substantially complete cylinder having means for directly supporting a pneumatic tire on the outer cylindrical surface, the meeting ends of which sections are in two nearly radial converging planes each forming an acute angle with the plane of the edge of the rim, the longer of said sections being removable axially from the shorter one when the tire is in position on the shorter section.

In testimony whereof we have hereunto affixed our signatures.

CHARLES L. PETERS.
ALVIN L. JOHNSON.

It is hereby certified that in Letters Patent No. 1,326,418, granted December 30, 1919, upon the application of Charles L. Peters and Alvin L. Johnson, of Worcester, Massachusetts, for an improvement in "Demountable Rims," an error appears in the printed specification requiring correction as follows: Page 2, line 51, claim 1, for the word "movable" read *removable;* and that the said Letters Patent should be read with this correction therein that the same may conform to the record of the case in the Patent Office.

Signed and sealed this 8th day of June, A. D., 1920.

[SEAL.]

M. H. COULSTON,
*Acting Commissioner of Patents.*

Cl. 152—21.